July 12, 1949.  A. E. RODD  2,475,988
IONIZATION GAUGE HAVING AN EXCHANGEABLE FILAMENT
Filed Nov. 8, 1948  2 Sheets-Sheet 2
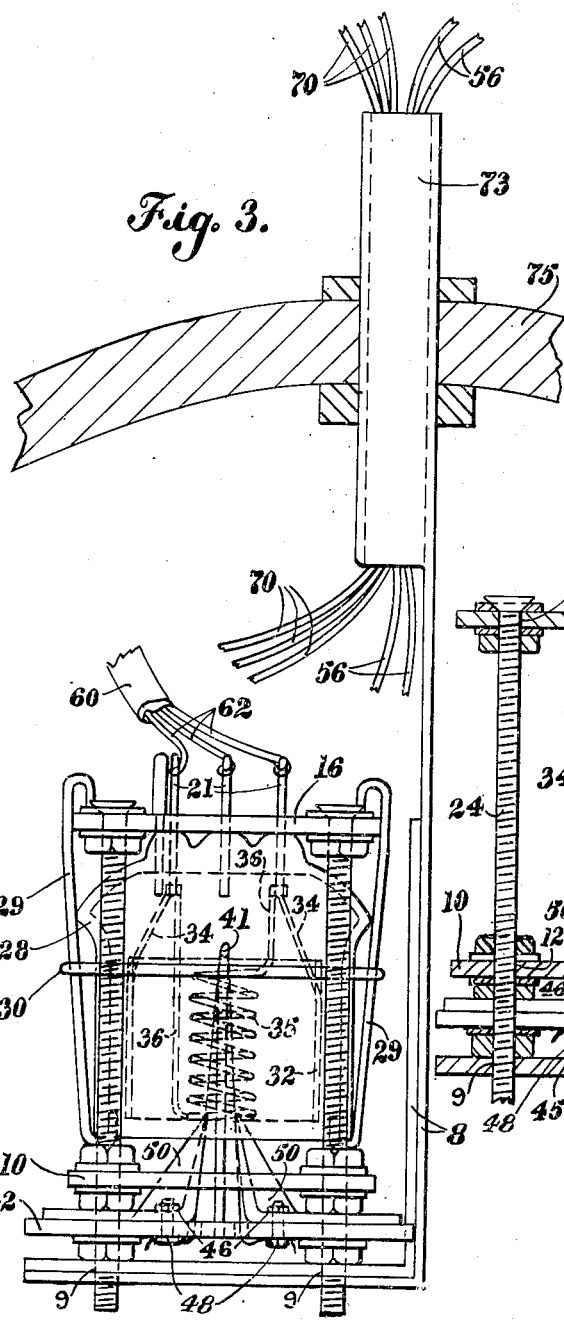
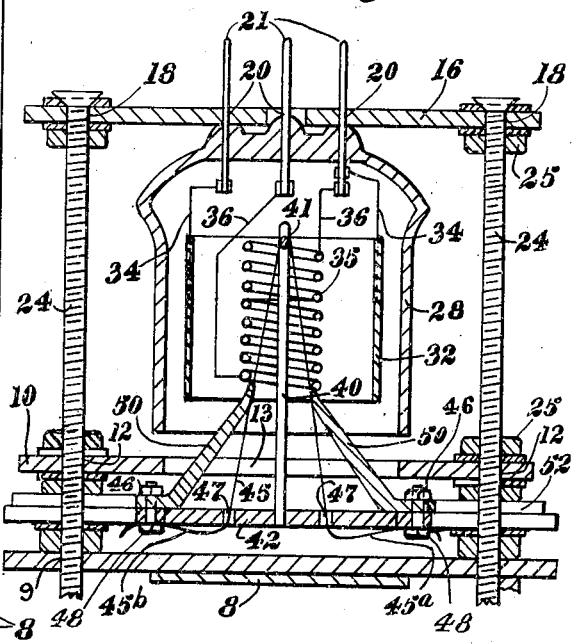
INVENTOR.
Albert E. Rodd
Harold E. Cole
BY
ATTORNEY Patented July 12, 1949

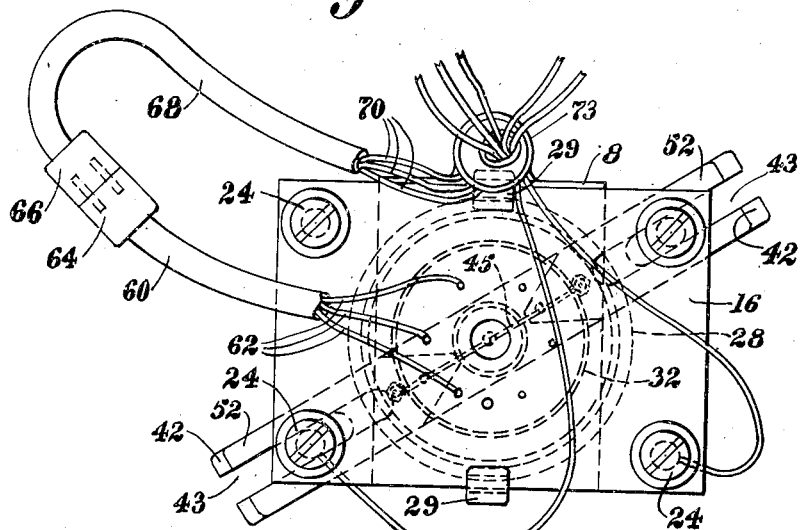
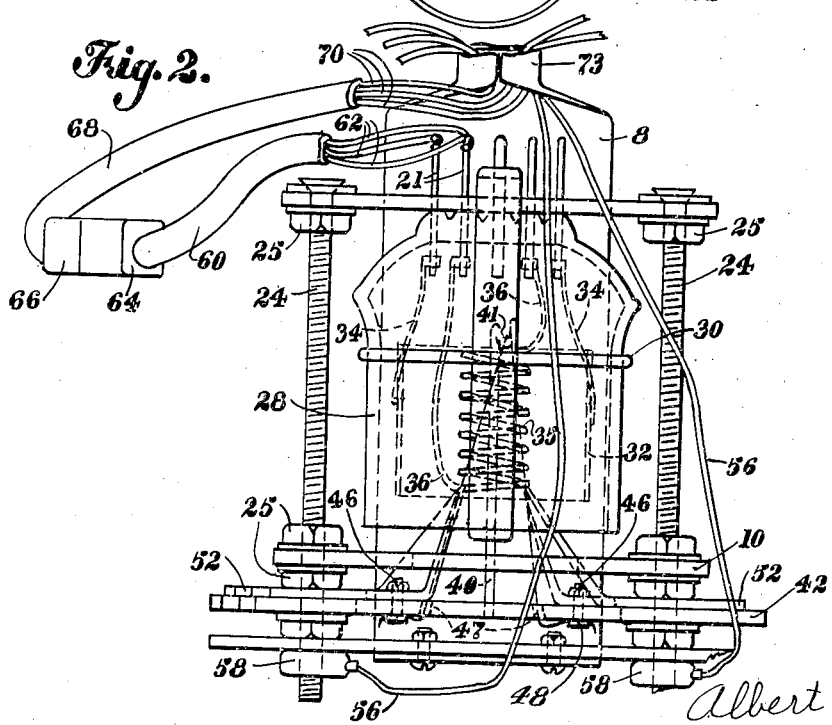

2,475,988

UNITED STATES PATENT OFFICE 2,475,988

IONIZATION GAUGE HAVING AN EXCHANGEABLE FILAMENT

Albert E. Rodd, Arlington, Mass., assignor to Bradford Novelty Co., Inc., Cambridge, Mass., a corporation Application November 8, 1948, Serial No. 59,000

14 Claims. (Cl. 250—27.5)

This invention relates to a ionization gauge having an exchangeable filament.

The principal object of my invention is to provide an ionization gauge so constructed that its filament may be removed and another inserted in place thereof. Since these ionization gauges are expensive and it is usually only the filament that gives out, a great saving can be made by constructing said gauge so new filaments may be inserted to replace the old ones.

The foregoing and other objects which will appear as the nature of the invention is better understood, may be accomplished by a construction, combination and arrangement of parts such as is disclosed by the drawing and specification. The nature of the invention is such as to render it susceptible to various changes and modifications, and, therefore, I am not to be limited to said disclosures; but am entitled to all such changes therefrom as fall within the scope of my claims.

In the drawings:

Figure 1 is a top plan view of my ionization gauge and Figure 2 is a front elevation view thereof.

Figure 3 is a side elevational view of my ionization gauge showing a fragment of the manifold of the vacuum tank through which the lead-in wires extend and showing a bracket in which my gauge is mounted.

Figure 4 is a longitudinal sectional view through my gauge.

As illustrated, my ionization gauge is mounted on an angle bracket 8 which, in use, extends into a vacuum tank. Said bracket 8 has holes 9 at the bottom.

Said gauge is supported by a frame having a lower plate 10 having holes 12 at opposite ends and a large central hole 13 therein for the wire filament and filament guides, later described, to pass through. It also has a top plate 16 having holes 18 at opposite ends and other holes 20 for terminals 21 to pass through. Bolts 24 and various nuts 25 hold said frame top and bottom plates and other parts, later described, together.

My ionization gauge has an outside globe or envelope 28, open at the bottom which is usually made of glass, the top of which bears against said frame top plate 16. Two straps 29 hook under said envelope 28 and hook over said top plate 16 and a metal band 30 encircles said envelope and tightly extends around said straps 29, thus keeping said envelope in a fixed position.

Within said envelope 28 is the usual metal plate 32 in the form of a sleeve from opposite sides of which wires 34 extend to two of said terminals 21. A wire coil grid 35 is within said plate 32, and has wires 36 extending to two of said terminals 21.

A filament supporting post 40, having an upper end in the form of a hook 41 is set in and supported by a cross bar 42 made of Bakelite or insulating material and forming part of my gauge supporting means. Said post extends within and above said grid 35. Said cross bar has slots 43 at opposite ends to permit adjustment of filament guides later described. A filament wire 45 is suspended from said hook 41 and extends downwardly through two holes 47 in said cross bar 42 and opposite ends 45a and 45b are anchored by nuts 46 on machine screws 48 which extend through guides 50, later described, and said cross bar 42. The usual electrical assembly within the envelope of an ionization gauge is constituted of a plate, grid and filament and the electrical wire connected thereto.

Two guides 50 to keep said filament wire 45 properly positioned serve as terminals for working parts of filament 45. They extend through said large hole 13 in said lower plate 10 to a point just below said grid 35 where their ends taper. Slots 52 are provided in the horizontally extending lower ends of said guides and they are held in position by said bolts 24 and nuts 25 just above said cross bar 42.

Filament lead-in connector wires 56 from a source of electrical energy are attached to the lower end of said bolts 24 by clips 58. A cable 60 encloses three wires 62 that connect with said terminals 21. A plug 64 on said cable 60 can be connected to another plug 66 attached to a cable 68 enclosing plate and grid wires 70 which are connected to an electrical source not shown.

Said wires 56 and 70 pass through a tube 73 which is used as a vacuum seal and extends through a manifold 75.

My ionization gauge sets within the vacuum area of said vacuum tank.

The electrical current passes through said guides 50 and said filament.

Said slots 52 in said guides 50 permit ready adjustment of the position of said guides so said filament wire 45 can be positioned and held correctly in the electrical assembly within said envelope 28. Likewise said slots 43 in said cross bar 42 permit ready adjustment thereof.

What I claim is:

1. An ionization gauge comprising supporting means, an envelope supported by said means and having an opening therein, a filament support extending into said envelope and supported by said supporting means, an electrical assembly within said envelope embodying a filament, said filament being removably supported within said envelope by said filament support, and a guide in contact with and maintaining said filament in a predetermined position and supported by said means.

2. An ionization gauge comprising supporting means, an envelope supported by said means and having an opening therein, a filament support extending into said envelope and supported by said supporting means, an electrical assembly within said envelope embodying a filament, said filament being removably supported within said envelope by said filament support, and two guides in contact with and maintaining said filament in a predetermined position and supported by said means, said filament extending below said envelope and below said points of contact.

3. An ionization gauge comprising supporting means, an envelope supported by said means and having an opening therein, a filament support extending into said envelope and supported by said supporting means, an electrical assembly within said envelope embodying a filament, said filament being removably supported within said envelope by said filament support, and means maintaing said filament in a predetermined position and supported by said supporting means.

4. An ionization gauge comprising supporting means, an envelope supported by said means and having an opening therein, a filament support extending into said envelope and supported by said supporting means, an electrical assembly within said envelope embodying a filament wire extending into said envelope, said filament wire being removably supported within said envelope by said filament support, and two guides in contact with different portions of said filament wire and maintaining said wire in a predetermined position and supported by said means, said filament wire portions extending below said envelope and below said points of contact.

5. An ionization gauge comprising supporting means, an envelope supported by said means and having an opening therein, a filament support extending into said envelope and supported by said supporting means, an electrical assembly within said envelope embodying a filament wire extending into said envelope, said filament wire being removably supported within said envelope by said filament support, and two guides in contact with different portions of said filament wire and maintaining said wire in a predetermined position and supported by said means, said filament wire portions extending below said envelope and below said points of contact and below said guides and attached to said supporting means.

6. An ionization gauge comprising supporting means, and an envelope supported by said means and having an opening therein, said means embodying two upwardly extending straps extending between and holding said envelope to said means, a holding band extending around said envelope and straps and contacting and holding said straps in position, a filament support extending into said envelope and supported by said supporting means, an electrical assembly within said envelope embodying a filament wire extending into said envelope, said filament wire being removably supported within said envelope by said filament support, and two guides in contact with different portions of said filament wire and maintaining said wire in a predetermined position and supported by said means.

7. An ionization gauge comprising supporting means, an envelope supported by said means and having an opening at the bottom, a filament support extending into said envelope and supported by said supporting means, an electrical assembly within said envelope embodying a plate, a coil grid and a filament wire, said wire extending into said envelope and forming a loop at the top which loop extends over and is supported by said filament support, two portions of said wire extending through said coiled grid longitudinally and spaced therefrom, and two guides in contact with different portions of said filament wire below said grid and maintaining said wire in a predetermined position within said grid, said guides being supported by said supporting means.

8. An ionization gauge comprising supporting means, an envelope supported by said means and having an opening at the bottom, a filament support extending into said envelope and supported by said supporting means, an electrical assembly within said envelope embodying a plate, a coiled grid and a filament wire, said wire extending into said envelope and forming a loop at the top which loop extends over and is supported by said filament support above said grid, two portions of said wire extending through said coiled grid longitudinally and spaced therefrom and extending below said grid, and two guides in contact with different portions of said filament wire below said grid and maintaining said wire in a predetermined position within said grid, said guides being supported by said supporting means.

9. An ionization gauge comprising a supporting frame embodying a lower plate having a central opening, a top plate, and pin members connecting said plates together, an envelope having a bottom opening, said envelope bearing against said top plate and being above said bottom plate, a filament support extending through said bottom plate opening and supported by said frame, an electrical assembly within said envelope embodying a filament removably supported within said envelope by said filament support and extending therefrom downwardly through said bottom plate opening, and two guides in contact with two different portions of said filament and maintaining said filament in a predetermined position within said envelope, said guides being supported by said frame.

10. An ionization gauge comprising a supporting frame embodying a lower plate having a central opening, a top plate and pin members connecting said plates together, an envelope having a bottom opening, said envelope bearing against said top plate and being above said bottom plate, a filament support extending through said bottom plate opening and supported by said frame, an electrical assembly within said envelope embodying a filament removably supported within said envelope by said filament support and extending therefrom downwardly through said bottom plate opening, and two guides in contact with two different portions of said filament and maintaining said filament in a predetermined position within said envelope, said guides being supported by said frame, said supporting frame embodying a cross bar, two portions of said wire filament extending to and being attached to opposite end portions of said cross bar.

11. An ionization gauge comprising supporting means, an envelope having an opening supported by said means, a filament support extending into said envelope and supported by said supporting means, an electrical assembly within said envelope embodying a filament wire removably supported within said envelope by said filament support, two guides in contact with different portions of said filament wire and maintaining it in a predetermined position supported by said means, said guides having slots in their end portions, and pin members extending through said guide slots and holding said guides to said supporting means in predetermined position.

12. An ionization gauge comprising supporting means, an envelope having an opening supported by said means, a filament support extending into said envelope and supported by said supporting means, an electrical assembly within said envelope embodying a filament wire removably supported within said envelope by said filament support, two guides in contact with different portions of said filament wire and maintaining it in a predetermined position supported by said means, said guides having slots in their end portions, said supporting means embodying a cross bar having slots in opposite end portions thereof, and pin members extending through said cross bar slots and said guide slots and holding said guides and cross bar in predetermined position, said filament wire different portions extending to said pin members and being attached thereto.

13. An ionization gauge comprising supporting means, an envelope having an opening supported by said means, a filament support extending into said envelope and supported by said supporting means, an electrical assembly within said envelope embodying a filament wire removably supported within said envelope by said filament support, two guides in contact with different portions of said filament wire and maintaining it in a predetermined position supported by said means, said guides having slots in their end portions, said supporting means embodying a cross bar having slots in opposite end portions thereof, and pin members extending through said cross bar slots and said guide slots and holding said guides and cross bar in predetermined position, said filament wire different portions extending in opposite directions below said guides and attached to opposite portions of said supporting frame.

14. An ionization gauge comprising supporting means, an envelope supported by said means and having an opening therein, a filament support extending into said envelope and supported by said supporting means and embodying a hook portion, an electrical assembly embodying a filament wire having a loop portion that rests on said hook portion, and means in contact with and maintaining said filament in a predetermined position and supported by said supporting means.

ALBERT E. RODD.

No references cited.